United States Patent [19]

Kieren et al.

[11] Patent Number: 5,008,560
[45] Date of Patent: Apr. 16, 1991

[54] LOAD TOTALIZING BLOCKED THROWOVER CONTROL

[75] Inventors: Roger Kieren, Grosse Pointe Woods; David A. Jamison, Livonia; John J. Thomas, Rochester, all of Mich.

[73] Assignee: The Detroit Edison Company, Detroit, Mich.

[21] Appl. No.: 314,049

[22] Filed: Feb. 23, 1989

[51] Int. Cl.⁵ .......................... H02J 3/04; H02J 3/38
[52] U.S. Cl. ........................ 307/19; 307/18; 307/83; 307/86
[58] Field of Search ................... 307/41-66, 307/82-87, 18-20, 31, 32, 35, 38, 39, 125-131, 23, 29, 80, 17, 80, 81; 361/89-93, 20, 35, 64

[56] References Cited

U.S. PATENT DOCUMENTS

| | | |
|---|---|---|
| 3,317,741 | 5/1967 | McClain ............................... 307/64 |
| 3,422,276 | 1/1969 | Sullivan ............................... 307/29 |
| 3,934,155 | 1/1976 | Galitsyn ............................... 307/112 |
| 4,110,808 | 8/1978 | Hobson, Jr. et al. ............... 361/44 |
| 4,403,292 | 9/1983 | Ejzak et al. ......................... 364/492 |

Primary Examiner—A. D. Pellinen
Assistant Examiner—David Osborn
Attorney, Agent, or Firm—Barnes, Kisselle, Raisch, Choate, Whittemore & Hulbert

[57] ABSTRACT

An electric utility sub-station having two transformers which transmit electric energy to customers in different service areas. A throwover is provided which is operative, when a failure occurs in one transformer, to switch the load normally carried by the failed transformer over to the other transformer which then carries the load of both transformers. Operation of the throwover is blocked when the total demand load on both transformers exceeds the capacity of either transformer.

10 Claims, 2 Drawing Sheets

LOAD TOTALIZING BLOCKED THROWOVER CONTROL

This invention relates generally to a throwover control for a power transmitting sub-station of an electric utility and refers more particularly to apparatus for automatically blocking operation of the throwover control when total demand load exceeds a predetermined value.

BACKGROUND OF THE INVENTION

Electric utilities have sub-stations which receive electricity from a generating station for transmission to customers in the service area of the sub-station. Many sub-stations have two transformers each supplying part of the load, one supplying power to one set of customers and the other supplying power to other customers.

It is common practice to provide for the failure of one of the transformers by a throwover control system which automatically transfers all of the load normally carried by the failed transformer to the other transformer. Such throwover control systems work satisfactorily as long as the total demand load on the two transformers does not exceed the capacity of either one transformer. One object of this invention is to provide a means for monitoring the total demand load on both transformers and for automatically blocking the operation of the throwover control when total demand load exceeds the capacity of either transformer.

Other objects will become more apparent as the following description proceeds, especially when considered with the accompanying drawings.

DETAILED DESCRIPTION

Figure 1:
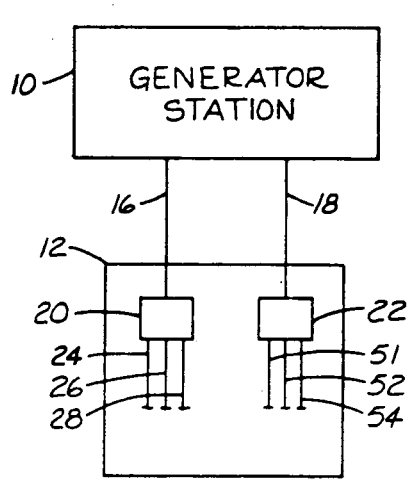
FIG. 1 is a diagrammatic view illustrating a generating station and sub-station of an electric utility, including the associated therewith.

Referring now more particularly to the drawings and especially FIG. 1, the numeral 10 designates a generating station of an electric utility which supplies electricity at high voltage to a sub-station 12 via lines 16 and 18. The sub-station 12 has two power systems including transformers 20 and 22 which transmit the electricity to customers over power lines at a reduced voltage.

Figure 2:
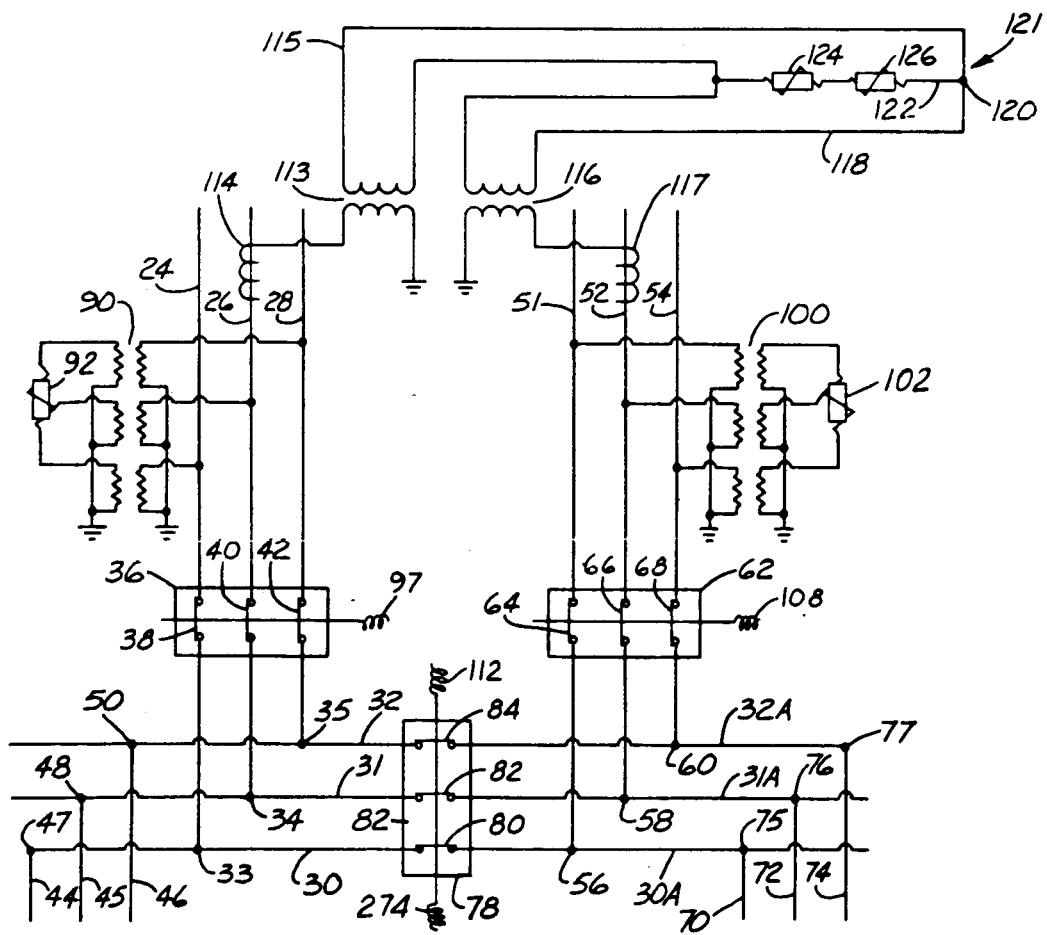
FIG. 2 is a wiring diagram showing the power lines leading from the transformers, the circuit breakers, tie breakers and a summing circuit for producing a current proportional to total demand load.

Referring to FIG. 2, leads 24, 26 and 28 from the transformer 20 (FIG. 1) connect to the bus conductors 30, 31 and 32 near one end thereof at points 33, 34 and 35. A circuit breaker 36 in leads 24, 26 and 28 has normally closed contacts 38, 40 and 42. Service lines 44, 45 and 46 are connected to the bus conductors 30, 31 and 32 at one end thereof at points 47, 48 and 50 to supply electricity to customers in a designated service area.

Leads 51, 52 and 54 from transformer 22 (FIG. 1) connect to the bus conductors 30A, 31A and 32A near the opposite end thereof at points 56, 58 and 60. A circuit breaker 62 in leads 51, 52 and 54 has normally closed contacts 64, 66 and 68. Service lines 70, 72 and 74 are connected to the bus conductors at the opposite end thereof at points 75, 76 and 77 to supply electricity to customers in another designated service area.

There is a tie breaker 78 between the bus conductors 30, 31 and 32 and the bus conductors 30A, 31A and 32A. Tie breaker 78 has normally open contacts 80, 82 and 84. Contact 80 is between bus conductors 30, 30A, contact 82 is between bus conductors 31, 31A and contact 84 is between bus conductors 32, 32A. These normally open contacts keep the two transformers and their service lines separated from one another so that normally they operate independently to supply electric power to their respective service areas.

Figure 3:
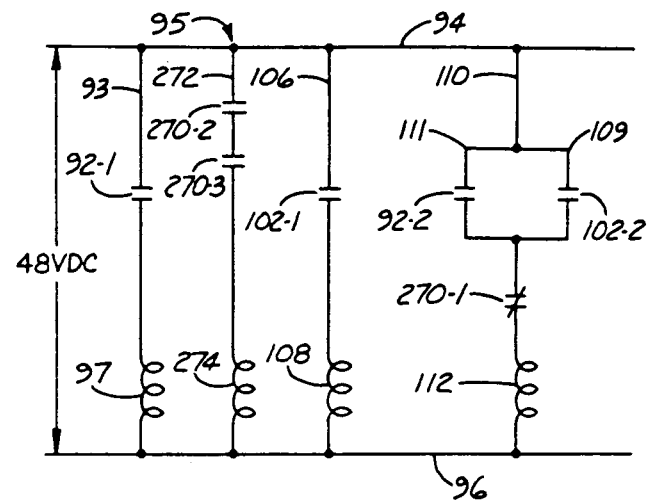
FIG. 3 is a wiring diagram showing part of a throwover control circuit.

Referring further to FIG. 2, an instrument transformer 90 connected to the leads 24, 26 and 28 from transformer 20 operates a voltage measuring relay 92. The relay 92 is activated during normal operation of the transformer 20 by the voltage in leads 24, 26 and 28. Referring to FIG. 3, the relay 92 has a contact 92-1 in a line 93 leading to the trip coil 97 of circuit breaker 36. Line 93 is in a control circuit 95 which may be operated by 48 volt DC voltage between lines 94 and 96. When energized, this trip coil 97 operates to open the contacts of the circuit breaker 36. However, during the time that relay 92 is energized, as it is in the normal operation of transformer 20, it holds contact 92-1 open and thus the circuit to the circuit breaker trip coil 97 is open so that the trip coil is not energized and the circuit breaker contacts remain closed.

An instrument transformer 100 is connected to the leads 51, 52 and 54 leading from transformer 22 and operates a voltage measuring relay 102. Relay 102 is activated during normal operation of transformer 20 by voltage in leads 51, 52 and 53. Relay 102 has a contact 102-1 in the line 106 in control circuit 95 (FIG. 3) which leads to the trip coil 108 for the circuit breaker 62. When this trip coil 108 is energized, it opens the contacts of the circuit breaker 62. However, during the time that relay 102 is energized, as it is in normal operation of transformer 22, it holds contact 102-1 open and thus the circuit to the circuit breaker trip coil 108 is open so that the trip coil is not energized and the contacts of the circuit breaker 62 remain closed.

It is in this condition that the two transformers 20 and 22 normally provide power to their service areas through the leads and normally closed circuit breakers. During this time, the tie breaker is open. However, in the event that one transformer or the other should fail or go out of service for any reason, it is then desired to switch or throwover the demand service load normally serviced by the failed transformer to the other transformer. To accomplish the throwover, the circuit breaker of the failed transformer is opened and the tie breaker is closed.

Assuming that the transformer 22 should suddenly drop out of service, in which case no current will be flowing from the transformer in leads 51, 52 and 54, the relay 102 will be deactivated causing its contact 102-1 (FIG. 3) to close and complete the circuit to the circuit breaker trip coil 108, energizing the trip coil and opening circuit breaker 62.

Relay 102 also has a contact 102-2 (FIG. 3) in a branch 109 of line 110 in control circuit 95 leading to the closing coil 112 of the tie breaker 78. During the time that relay 102 is operated, as it is in normal operation of transformer 22, it holds contact 102-2 open and thus the circuit to the closing coil 112 is open so that the closing coil is not energized and the tie breaker contacts remain open. However, if transformer 22 should fail, relay 102 will be deactivated. Contact 102-2 in the circuit to the tie breaker closing coil 112 will close, closing the circuit in line 110 to energize the closing coil and cause the contacts of the normally open tie breaker to close. The demand load on transformer 22 will thereupon be switched over to and carried by the remaining transformer 20 which thenceforth will supply electricity not only to the service lines 44, 45 and 46 in its own service area but also to the service lines 70, 72 and 74 in the service area normally handled by transformer 22.

Relay 92 also has a contact 92-2 (FIG. 3) in a branch 111 of the line 110 of control circuit 95 leading to the closing coil 112 of the tie breaker 78. Branches 109 and 111 are in parallel with one another. While relay 92 is operated, as during normal operation of transformer 20, relay 92 holds contact 92-2 open so that the closing coil 112 of the tie breaker 78 is not energized. However, if transformer 20 fails and relay 92 is deactivated, relay contact 92-2 closes, closing the circuit in line 110 to the closing coil 112 and causing the tie breaker 78 to close. The demand load on transformer 20 is then switched over to transformer 22.

This arrangement works satisfactorily as long as the total demand load on the two transformers is less than the maximum which either one can handle in an emergency. Throwover should not occur, however, when total demand load exceeds the capacity of either one transformer.

For example, if each of the two transformers has a maximum capacity of ten megavolt amps (MVA), throwover should not occur when the combined demand load on the two transformers exceeds that amount, that is exceeds ten MVA, because then one transformer would be called upon to service a total demand load in excess of its capacity. This invention provides a means for automatically blocking throwover when the total demand load on the two transformers exceeds a predetermined maximum, which in this example would be 10 MVA.

There is an isolating auxiliary current transformer 113 ( FIG. 2) operated by the current transformer 114 associated with the transformer lead 26 from the transformer 20. Current from the isolating auxiliary current transformer 113 proportional to the current demanded of the transformer 20 is supplied to line 115.

Referring further to FIG. 2, there is a second isolating auxiliary current transformer 116 operated by a current transformer 117 associated with the transformer lead 52 from transformer 22. The isolating auxiliary current transformer 116 produces current which is proportional to the current demanded of transformer 22, and supplies that current through line 118.

The current in lines 115 and 118 from the current transformers 113 and 116 leads to a common current junction 120 of a summing circuit 121 where the sum of the two currents then passes through line 122. The current in line 122 is proportional to the total demand load current being supplied by the two transformers.

There are two load sensing relays 124 and 126 (FIG. 2) in series in line 122. Relay 124 is a relay set for summer load and relay 126 is a relay set for winter load. These relays are set for maximum allowable total demand of both transformers and are not activated until the current passing through them rises to a predetermined value (different for each relay) indicative of total demand. When the current reaches the predetermined value established for the relay 124, its contacts will operate. When the current reaches the predetermined value established for relay 126, its contacts will operate. Thus one relay or the other, depending on which one is to be in control, will initiate the blocking of the throwover mechanism.

One of the relays 124, 126 will be in control depending on the position of a summer-winter switch 130 (FIG. 5) which has two positions, S (summer) and W (winter). It is commonly understood that the load capacity of the transformers 20 and 22 will depend upon outside temperature and that is the reason for separate relays 124 and 126 and for a summer-winter switch. The summer-winter switch 130 has six contacts 131 - 136 seen in both FIGS. 4 and 5. In the S position of switch 130, contacts 131, 132, 134 and 135 are closed and contacts 133 and 136 are open. In the W position, contacts 132, 133, 135 and 136 are closed and contacts 131 and 134 are open. See FIG. 5.

Figure 4:
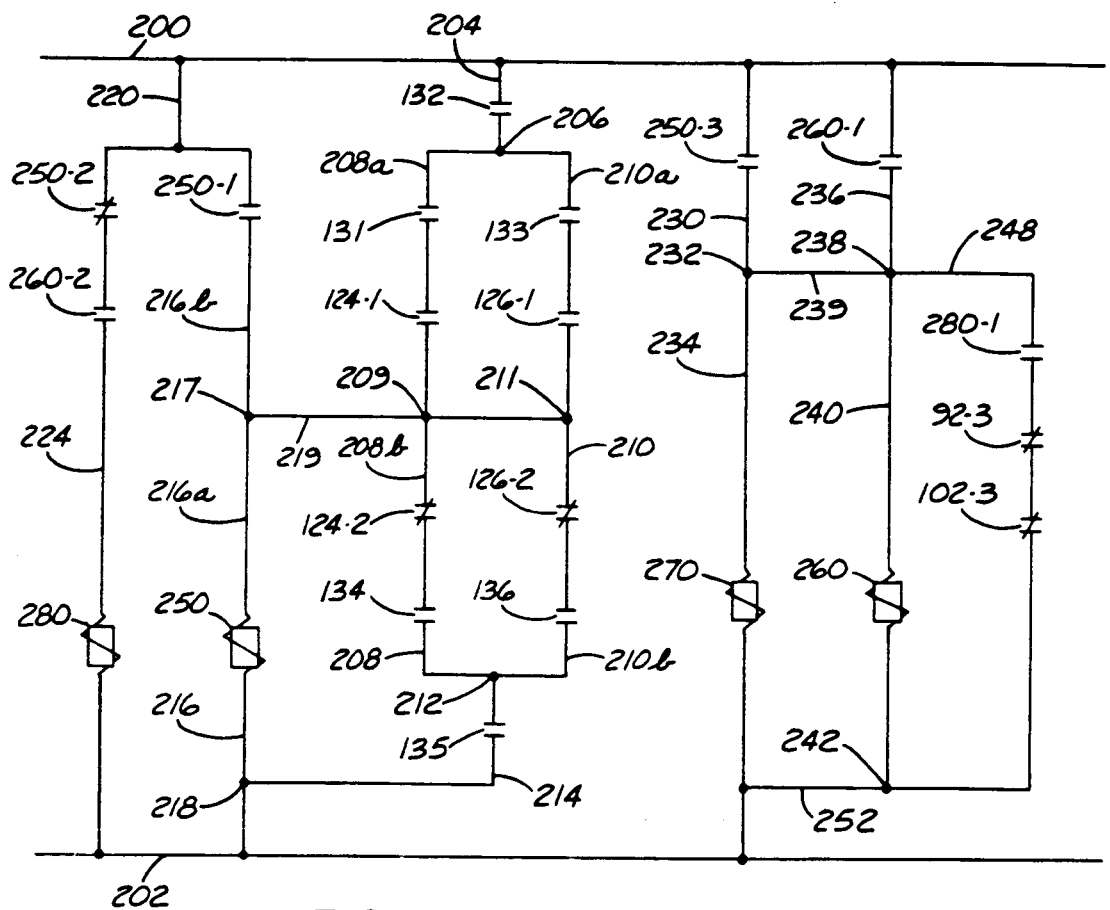
FIG. 4 is a wiring diagram showing a control circuit for blocking operation of the throwover control.
Figure 5:
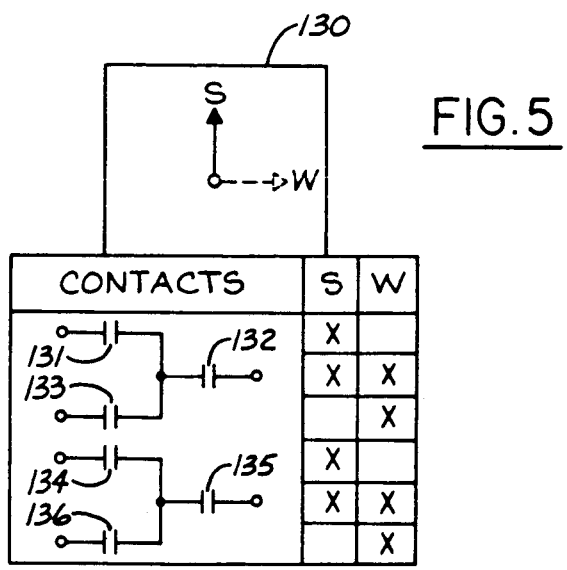
FIG. 5 shows diagrammatically a summer-winter switch and its contacts.

Referring to FIG. 4, the system includes a control circuit 199 which in this instance may be operated by 48 volt DC voltage between lines 200 and 202. A line 204 from line 200 leads to a junction 206 from which parallel lines 208 and 210 lead to a junction 212. The lines 208 and 210 have intermediate junction points 209 and 211 dividing line 208 into segments 208a and 208b and dividing line 210 into segments 210a and 210b. Line 214 from junction 212 connects to line 216 at 218. A line 220 from line 200 leads to a junction 222 from which parallel lines 224 and 216 lead to line 202.

Summer-winter switch contact 131 (FIG. 5) is in line segment 208a, contact and 134 is in line segment 208b, contact 132 is in line 204, contact 133 is in line segment 210a, contact 136 is in line segment 210b, and contact 135 is in line 214. Line 216 has line segments 216a and 216b connecting at junction 217. Line 219 connects junctions 209, 211 and 217.

The control circuit 199 (FIG. 4) also has a line 230 leading from line 200 to a junction 232 from which line 234 leads to line 202. Another line 236 leads from line 200 to junction 238 from which a line 240 leads to junction 242 to which line 202 is also connected by lines 234 and 252. A line 248 from junction 238 leads to junction 242. Relays 92 and 102 have contacts 92-3 and 102-3 in line 248. Contacts 92-3 and 102-3 are closed when the relays 92 and 102 are activated during normal operation of the transformers 20 and 22. Junctions 232 and 238 are connected by line 239.

The summer relay 124 has a normally open contact 124-1 in line segment 208a and a normally closed contact 124-2 in line segment 208b. Winter relay 126 has a normally open contact 126-1 in line segment 210a and a normally closed contact 126-2 in line segment 210b.

There is a time delay relay 250 in line segment 216a having a normally open contact 250-1 in line segment 216b, a normally closed contact 250-2 in line 224, and a normally open contact 250-3 in line 230.

There is a relay 260 in line 240 having normally open contacts 260-1, 260-2 in lines 236 and 224, respectively.

A throwover blocking relay 270 in line 234 has a normally closed contact 270-1 in line 110 to the tie breaker closing coil 112, and also has normally open contacts 270-2 and 270-3 (FIG. 3) in the line 272 in control circuit 95 to the trip coil 274 of the tie breaker 78. The trip coil 274, when activated, opens the contacts of the tie breaker 78.

A time delay relay 280 in line 224 (FIG. 4) has a normally open contact 280-1 in line 248.

In operation, and assuming that the total demand load on the two transformers 20 and 22 is less than the maximum which either one can handle, the throwover system will operate as described. In other words, if one transformer should fail, its demand load will be switched over to the other transformer. However, if the total demand load on the two transformers is more than the maximum which either can handle, the throwover system is blocked and the demand load on a transformer which fails will not be switched over to the other transformer.

Let it be assumed that the summer-winter switch 130 (FIG. 5) is in the S position so that its contacts 131, 132, 134 and 135 (FIG. 4) are closed and its contacts 133 and 136 are open. The summer load sensing relay 124 is in control. Let it further be assumed that total demand load on the transformers 20 and 22 is less than the capacity of either transformer. As an example, assume that the capacity of each transformer is 10 MVA and that each is operating to put out 4 MVA of electrical power. Obviously, if one transformer or the other were to fail under these circumstances, throwover should be permitted to occur as previously described. As will become more apparent, blocking will not occur as long as normally closed contact 270-1 (FIG. 3) to the tie breaker closing coil 112 is closed. Contact 270-1 opens only when throwover blocking relay 270 (FIG. 4) is activated. Relay 270 is not activated until relay 250 is activated. Relay 250 is shorted out by the circuit including lines 219, 208b and 214, and the closed contacts 124-2, 134 and 135.

However, if each transformer is putting out 7 MVA, then throwover should not occur. In that event, the current in line 122 (FIG. 2) of the summing circuit, which is proportional to total demand load, will be sufficient to activate the summer relay 124. Activation of load sensing relay 124 causes contact 124-1 to close and contact 124-2 to open. As a result, relay 250 is no longer shorted, but is activated by current in lines 204, 208a, 219 and 216a, across closed contacts 131, 132 and 124-1. Relay 250 is a time delay relay so that momentary surges will not cause it to operate.

After the time delay set in to relay 250 passes and the relay is activated, its contact 250-1 closes to seal in the circuit to relay 250. Con 250-2 line 224 in opens. Contact 250-3 in line 230 closes to activate throwover blocking relay 270 and to also activate relay 260 in line 240. Activation of relay 260 closes its contact 260-1 to seal in relays 260 and 270, and closes contact 260-2 in line 224. Activation of relay 270 opens its contact 270-1 (FIG. 3) in the circuit to the tie breaker closing coil 112 and closes its contacts 270-2 and 270-3 in the circuit to the tie breaker trip coil 274, so that the tie breaker 78 will remain open and throwover is not possible.

When the total demand load subsequently drops to less than the maximum that either transformer can carry (less than 10 MVA in the example), load sensing relay 124 (FIG. 2) will become deactivated, opening its contact 124-1 and closing its contact 124-2. As a result, relay 250 will be shorted out through circuit lines 219, 208b and 214. Deactivation of relay 250 opens contacts 250-1, 250-3, and closes contact 250-2. Closing of contact 250-2 closes the circuit to and energizes relay 280, closing its contact 280-1 in line 248 and shorting both relays 260 and 270. Relay 280 is a time delay relay so that momentary current fluctuations will not cause it to operate. As a result of the deenergization of throwover blocking relay 270, contact 270-1 (FIG. 3) in the circuit to the tie breaker closing coil 112 closes, and contacts 270-2 and 270-3 in the circuit of the tie breaker trip coil open. The tie breaker can again be closed if throwover is called for.

If the summer-winter switch 130 (FIG. 5) is in the W position, its contacts 132, 133, 135 and 136 (FIG. 4) are closed and its contacts 131 and 134 are open. Then if total demand load exceeds the maximum that either transformer 20, 22 can safely handle, the current in summing current line 122 will be sufficient to energize summer load sensing relay 126 which is now in control. Activation of relay 126 causes contact 126-1 to close and contact 126-2 to open. As a result, relay 250 is no longer shorted, but is activated as in the case when relay 124 was in control. Activation of relay 250 then causes activation of relays 260 and 270 and closing of contacts 270-2 and 270-3 (FIG. 3) and opening of contact 270-1 so that the circuit to the tie breaker 78 cannot be closed and throwover is not possible.

Continuing with the example in which each transformer has a maximum capacity of 10 MVA and the demand load on each transformer is 7 MVA, and assuming that throwover is blocked as described above, if one of the transformers should suddenly fail, the current in line 122 of the summing circuit (FIG. 2) would drop to a level below that which would operate the appropriate load sensing relay 124 or 126. However, because total energy demand remains above that which either transformer can safely handle, it is not desired that throwover should be unblocked. To preclude unblocking in this circumstance, relays 92 and 102 have contacts 92-3 and 102-3 in line 248 (FIG. 4) of the shorting circuit for relays 260 and 270. As already stated, these relays are energized during operation of the transformers 20 and 22 and maintain contacts 92-3 and 102-3 closed. However, if either transformer 20, 22 fails, the associated relay 92 or 102 becomes deenergized to open one of the contacts 92-3, 102-3, thereby preventing shorting of relays 260 and 270 so that the throwover system will not be unblocked. The deenergization of relay 92 or 102 would be substantially instantaneous, and in any event much more quickly than deenergization of relay 280 would occur. Therefore, even though relay 280 will be energized to close its contact 280-1 in line 248, this will occur only after the opening of one of the contacts 92-3, 102-3. Accordingly, short circuiting of relays 260 and 270 through line 248 will not occur and the throwover system will not be unblocked.

It is possible that the total station demand load will rise above the maximum allowable load of one transformer after a normal throwover has occurred. In that event, the controlling load sensing relay 124 or 126 will be operated to activate throwover blocking relay 270 in the manner previously described. Activation of relay 270 will close contacts 270-2 and 270-3 in line 272 to tie breaker trip coil 274 (FIG. 3) thereby opening the tie breaker 78 and terminating the throwover. Throwover cannot occur again until total demand load drops to a point where the controlling load sensing relay 124 or 126 is deactivated.

What is claimed:

1. In an electric utility sub-station having two power systems each comprising a transformer which transmits electrical energy to customers over services lines, throwover means operative, when a failure occurs in either system, to switch the lines of the failed system to the transformer of the other system so that said transformer of said other system then carries the load of both systems, means responsive to a failure in one of said systems to activate said throwover means, load sensing means for sensing the total demand load on both said transformers, and blocking means responsive to the sensing by said load sensing means of total demand load in excess of a predetermined maximum allowable value for blocking the operation of said throwover means.

2. In an electric utility sub-station having two power systems each comprising a transformer which transmits electrical energy to customers over services lines, throwover means operative, when a failure occurs in either system, to switch the lines of the failed system to the transformer of the other system so that said transformer of said other system then carries the load of both systems, means responsive to a failure in one of said systems to activate said throwover means, first load sensing means for sensing the total demand load on both said transformers and activated by total demand load in excess of a predetermined maximum allowable value, second load sensing means for sensing the total demand load on both said transformers and activated by total demand load in excess of a second predetermined maximum allowable value, blocking means operative when activated for blocking the operation of said throwover means, and means responsive selectively to the activation of one or the other of said first and second load sensing means for activating said blocking means.

3. Structure as defined in claim 2, including switch means for rendering said means for activating said blocking means responsive selectively to one or the other of said first and second sensing means.

4. Structure as in claim 2, including means for unblocking said throwover means when total demand load falls below said predetermined value.

5. Structure as in claim 4, including means for rendering said unblocking means inoperative when a failure occurs in one of said systems.

6. In an electrical utility sub-station having two power systems each comprising a transformer, leads from each transformer, bus lines, a tie breaker in said bus lines having normally open contacts, said leads of one said transformer being connected to said bus lines at one side of said tie breaker and said leads of the other transformer being connected to said bus lines at the other side thereof, customer service lines for said one transformer connected to said bus lines at said one side of said tie breaker and customer service lines for each other transformer connected to said bus lines at said other side of said tie breaker, a circuit breaker in the leads associated with each transformer having normally closed contacts, throwover means operative in response to a failure in one of said transformers, to open the contacts of the circuit breaker associated with the leads of the failed transformer and to close the contacts of said tie breaker so that the remaining operative transformer then carries the load of both systems, load sensing means for sensing the total demand load on both said transformers, and blocking means responsive to the sensing by said load sensing means of total demand load in excess of a predetermined maximum allowable value for blocking the closing of said tie breaker contacts.

7. Structure as in claim 6, including means for unblocking the closing of said tie breaker contacts when total demand load falls below said predetermined value.

8. Structure as in claim 7, including means for rendering said unblocking means inoperative when a failure occurs in one of said systems.

9. In an electrical utility sub-station having two power systems each comprising a transformer, leads from each transformer, bus lines, a tie breaker in said bus lines having normally open contacts, said leads of one said transformer being connected to said bus lines at one side of said tie breaker and said leads of the other transformer being connected to said bus lines at the other side thereof, customer service lines for said one transformer connected to said bus lines at said one side of said tie breaker and customer service lines for said other transformer connected to said bus lines at said other side of said tie breaker, a circuit breaker in the leads associated with each transfer having normally closed contacts, throwover means operative in response to a failure in one of said transformers, to open the contacts of the circuit breaker associated with the leads of the failed transformer and to close the contacts of said tie breaker so that the remaining operative transformer then carries the load of both systems, first load sensing means for sensing the total demand load on both said transformers and activated by total demand load in excess of a predetermined maximum allowable value, second load sensing means for sensing the total demand load on both said transformers and activated by total demand load in excess of a second predetermined maximum allowable value, blocking means operative when activated for blocking the closing of said tie breaker contacts, and means responsive selectively to the activation of one or the other of said first and second load sensing means for activating said blocking means.

10. Structure as defined in claim 9, including switch means for rendering said means for activating said blocking means responsive selectively to one or the other of said first and second sensing means.

* * * * *

UNITED STATES PATENT AND TRADEMARK OFFICE
CERTIFICATE OF CORRECTION

PATENT NO. : 5,008,560
DATED : April 16, 1991
INVENTOR(S) : Roger Kieren, et al

It is certified that error appears in the above-identified patent and that said Letters Patent is hereby corrected as shown below:

Column 7, line 34 "2" should be --1--

Column 7, line 49 "each" should be --said--

Signed and Sealed this

Eighth Day of September, 1992

Attest:

DOUGLAS B. COMER

Attesting Officer        Acting Commissioner of Patents and Trademarks